US008307362B1

(12) United States Patent
Gong et al.

(10) Patent No.: US 8,307,362 B1
(45) Date of Patent: Nov. 6, 2012

(54) RESOURCE ALLOCATION IN A VIRTUALIZED ENVIRONMENT

(75) Inventors: Changbin Gong, Shrewsbury, MA (US); Yu Teng, Shanghai (CN); Song Liu, Shanghai (CN); Rulian Fiske, Hopedale, MA (US)

(73) Assignee: EMC Corporation, Hopkinton, MA (US)

( * ) Notice: Subject to any disclaimer, the term of this patent is extended or adjusted under 35 U.S.C. 154(b) by 368 days.

(21) Appl. No.: 12/653,981

(22) Filed: Dec. 18, 2009

(51) Int. Cl.
*G06F 9/455* (2006.01)
*G06F 9/46* (2006.01)

(52) U.S. Cl. ............................. 718/1; 718/100; 718/104

(58) Field of Classification Search .............. 718/1, 100, 718/104
See application file for complete search history.

(56) References Cited

U.S. PATENT DOCUMENTS

| | | | | |
|---|---|---|---|---|
| 7,082,463 | B1 * | 7/2006 | Bradley et al. ................. | 709/223 |
| 7,280,560 | B2 * | 10/2007 | Bruckman et al. ............ | 370/468 |
| 7,412,492 | B1 | 8/2008 | Waldspurger | |
| 7,433,951 | B1 | 10/2008 | Waldspurger | |
| 7,577,722 | B1 | 8/2009 | Khandekar et al. | |
| 2004/0128384 | A1 * | 7/2004 | Rolia et al. .................... | 709/226 |
| 2008/0126547 | A1 | 5/2008 | Waldspurger | |
| 2009/0112789 | A1 | 4/2009 | Oliveira et al. | |
| 2009/0112811 | A1 | 4/2009 | Oliveira et al. | |
| 2009/0112879 | A1 | 4/2009 | Oliveira et al. | |
| 2009/0112880 | A1 | 4/2009 | Oliveira et al. | |
| 2009/0112921 | A1 | 4/2009 | Oliveira et al. | |
| 2009/0241108 | A1 * | 9/2009 | Edwards et al. ................... | 718/1 |
| 2011/0022438 | A1 * | 1/2011 | Lian ................. | 705/8 |
| 2011/0029969 | A1 * | 2/2011 | Venkataraja et al. ............ | 718/1 |
| 2011/0119748 | A1 * | 5/2011 | Edwards et al. ................ | 726/12 |

OTHER PUBLICATIONS

"Resource overbooking and Application Profiling in Shared Hosting Platforms" by Bhuvan Urgaonkar et al, 5th Symposium on Operating Systems Design and Implementation, 2002, fetched from http://www.cse.psu.edu/~bhuvan/papers/ps/overbooking.pdf.*

J. Matthews et al., "Virtual Machine Contracts for Datacenter and Cloud Computing Environments," *ACDC '09*, Jun. 19, 2009, Barcelona, Spain, 6 pp.
W. Zheng et al., "Cloud Service and Service Selection Algorithm Research," *GEC '09*, Jun. 12-14, 2009, Shanghai, China, pp. 1045-1048.
"Architectural Strategies for Cloud Computing," Oracle White Paper in Enterprise Architecture, Aug. 2009, 18 pp.
"VMware Virtual Machine File System: Technical Overview and Best Practices," VMware Technical White Paper, Version 1.0, WP-022-PRD-01-01, 2007, 19 pp.
"IT in the Cloud: Using VMware vCloud for Reliable, Flexible, Shared IT Resources," VMware White Paper, 2008, 8 pp. "VMware vSphere, the First Cloud Operating System, Provides an Evolutionary, Non-disruptive Path to Cloud Computing," VMware White Paper, 2009, 8 pp.
"VMware vSphere 4," VMware Cheat Sheet, 2009, 9 pp.
"Amazon Elastic Compute Cloud: Developer Guide," API Vers. Jul. 15, 2009, Amazon web sevices, 2009, 154 pp.
"Amazon Simple Storage Service: Developer Guide," API Vers. Mar. 1, 2006, Amazon web services, 2008, 153 pp.
"EMC Atmos Online Compute Service: Getting Started Guide," Document Revision A, Sep. 29, 2009, 35 pp.

* cited by examiner

*Primary Examiner* — Vincent Tran
(74) *Attorney, Agent, or Firm* — Muirhead and Saturnelli, LLC

(57) ABSTRACT

In a virtualized environment, provisioned virtual machines may be migrated between different servers as needed and, accordingly, may be clustered according to particular configurations and requirements. The system described herein provides techniques for controlling the provisioning of users' virtual machines among clusters based on determined requirements obtained from users' service level agreements (SLAs) and in accordance with an optimized allocation of resources to service the processes corresponding to the virtual machines. The provisioning of virtual machines according to the system described herein may be dynamically controlled and allow for over-provisioning of virtual machines to a cluster beyond that which would normally be supported at the cluster absent the provisioning control techniques provided by the system described herein. The over-provisioning may be controllable according to specific requirements identified in each user's SLA.

22 Claims, 15 Drawing Sheets

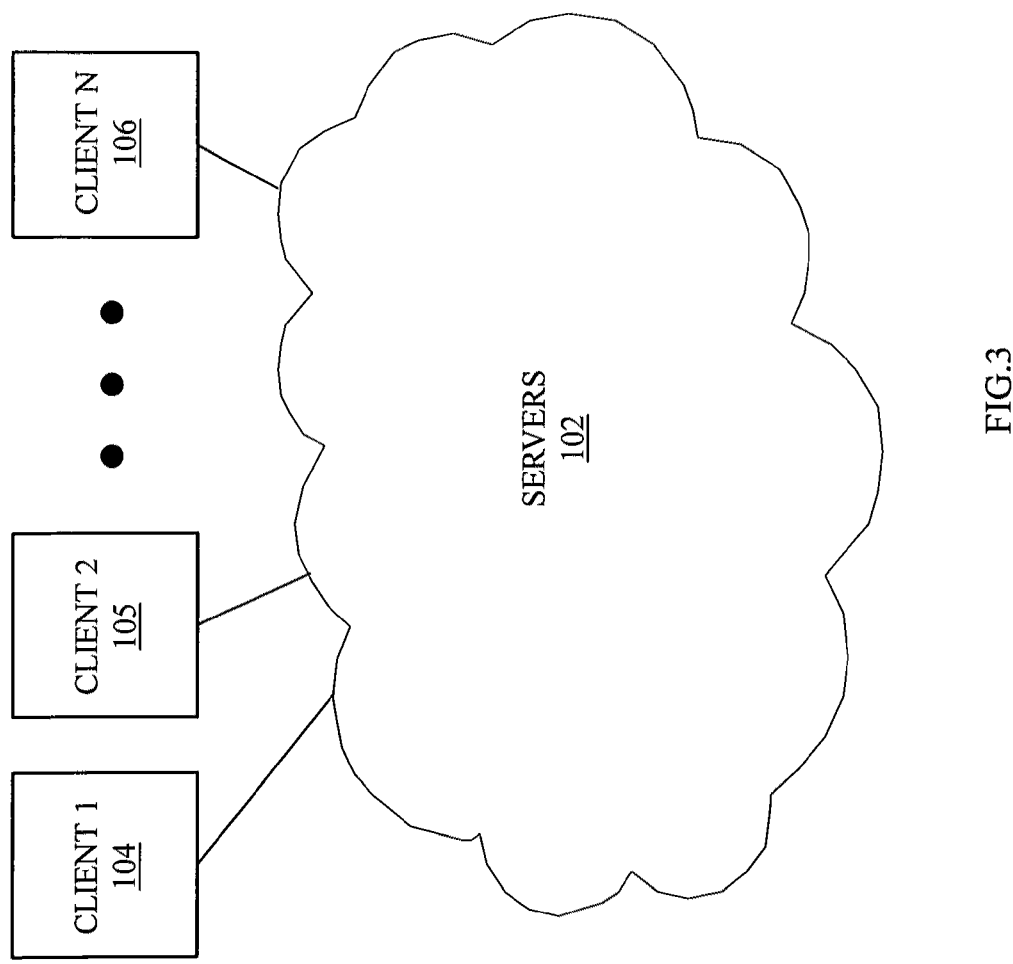

RESOURCE ALLOCATION IN A VIRTUALIZED ENVIRONMENT

TECHNICAL FIELD

This application relates to the field of computer networks, and more particularly to the field of allocating resources in a computer environment.

BACKGROUND OF THE INVENTION

In a virtualized environment, hosts use virtual switches to join tenants in a network fabric local to a server. Uplink ports on the switch may be connected to other virtual fabrics or to a real LAN through the host's physical network card. Co-locating diverse tenants in a virtualization environment requires a significant degree of resource isolation. Tenants on one virtual machine should not be able to access CPU processes, stored data, or the network traffic of another. Virtualization products may address this issue by assuming either a) tenants largely belong to the same organization, and/or b) the number of unique tenants is a relatively small number. Additionally, techniques such as assigning each organization a unique virtual local area network (VLAN) ID may be used to insure that traffic belonging to each unique tenant is sufficiently isolated. Virtual switches automatically tag traffic from a particular tenant, transparently providing data isolation from other tenants.

Tenancies in a virtualized environment may require dynamic allocation, termination and/or modification (increasing or decreasing capacity) according to business requirements of the tenants. This can make network management a difficult and costly proposition as known virtual machine provisioning processes for given tasks may be resource intensive and require significant human involvement and configuration. In particular, it may difficult to optimize resource allocation to meet the different requirements of multiple tenants.

Accordingly, it would be desirable to provide a system that allows for the improved allocation of resources in a virtualized environment.

SUMMARY OF THE INVENTION

According to the system described herein, a method of allocating resources in a computer system includes accessing information identifying service requirements between a service provider and each of a plurality of users. Processing resources are allocated to each of the plurality of users according to the information identifying service requirements between each of the plurality of users and the service provider, in which the total number of processing resources allocated to the users exceeds the total number of processing resources available. The processing resources may include at least one virtual machine for each of the users that corresponds to a process serviceable by the service provider, and in which the at least one virtual machine is assigned to at least one server of the service provider according to the allocation of resources to service the process corresponding to the at least one virtual machine. The process corresponding to the at least one virtual machine may require compute resources to be serviced, the compute resources including at least one of: a central processing unit, a memory, storage capacity, and networking bandwidth. The at least one server may be remotely accessible via the Internet to service the process of the at least one virtual machine for each of the users. The virtual machines of the plurality of users may be grouped into at least one cluster for servicing by the service provider. The information identifying service requirements may be accessed from a service level agreement between each of the plurality of users and the service provider. The service provider may provide computing as a service via a cloud computing environment.

According further to the system described herein, a computer readable storage medium stores computer software that allocates resources in a computer system, the computer software including executable code that accesses information identifying service requirements between a service provider and each of a plurality of users. Executable code is provided that allocates processing resources to each of the plurality of users according to the accessed information identifying service requirements between each of the plurality of users and the service provider, in which the total number of processing resources allocated to the users exceeds the total number of processing resources available. The processing resources may include at least one virtual machine for each of the users that corresponds to a process serviceable by the service provider, and wherein the at least one virtual machine is assigned to at least one server of the service provider according to the allocation of resources to service the process corresponding to the at least one virtual machine. The process corresponding to the at least one virtual machine may require compute resources to be serviced, the compute resources including at least one of: a central processing unit, a memory, storage capacity, and networking bandwidth. The at least one server may be remotely accessible via the Internet to service the process of the at least one virtual machine for each of the users. The virtual machines of the plurality of users may be grouped into at least one cluster for servicing by the service provider. The information identifying service requirements may be accessed from a service level agreement between each of the plurality of users and the service provider. The service provider may provide computing as a service via a cloud computing environment.

According to the system described herein, a method of requesting resources in a computer system includes each of a plurality of users providing information identifying service requirements required of a service provider. Each of the plurality of users may request processing resources according to the information identifying service requirements required of the service provider, in which the total number of processing resources requested by all of the plurality of users exceeds the total number of processing resources available at the same time, and in which the service requirements from the information identifying service requirements required of the service provider are satisfied for each of the plurality of users. The processing resources may include at least one virtual machine for each of the users that corresponds to a process serviceable by the service provider, and wherein the at least one virtual machine is assigned to at least one server of the service provider according to the allocation of resources to service the process of the at least one virtual machine. The process corresponding to the at least one virtual machine may require compute resources to be serviced, the compute resources including at least one of: a central processing unit, a memory, storage capacity, and networking bandwidth. The virtual machines of the plurality of users may be grouped into at least one cluster for servicing by the service provider.

According to the system described herein, a computer readable storage medium storing computer software that requests resources in a computer system, the computer software including executable code that provides, for each of a plurality of users, information identifying service requirements required of a service provider. Executable code is provided that requests, for each of the plurality of users, processing resources according to the information identifying service requirements required of the service provider, in which the total number of processing resources requested by all of the plurality of users exceeds the total number of processing resources available at the same time, and in which the service requirements from the information identifying service requirements required of the service provider are satisfied for each of the plurality of users. The processing resources may include at least one virtual machine for each of the users that corresponds to a process serviceable by the service provider, and wherein the at least one virtual machine is assigned to at least one server of the service provider according to the allocation of resources to service the process of the at least one virtual machine. The process corresponding to the at least one virtual machine may require compute resources to be serviced, the compute resources including at least one of: a central processing unit, a memory, storage capacity, and networking bandwidth. The virtual machines of the plurality of users may be grouped into at least one cluster for servicing by the service provider.

BRIEF DESCRIPTION OF THE DRAWINGS

Embodiments of the system are described with reference to the several figures of the drawings which are briefly described as follows.

FIG. 3 is a schematic diagram illustrating servers and clients according to an embodiment of the system described herein.

DETAILED DESCRIPTION OF VARIOUS EMBODIMENTS

Figure 1:
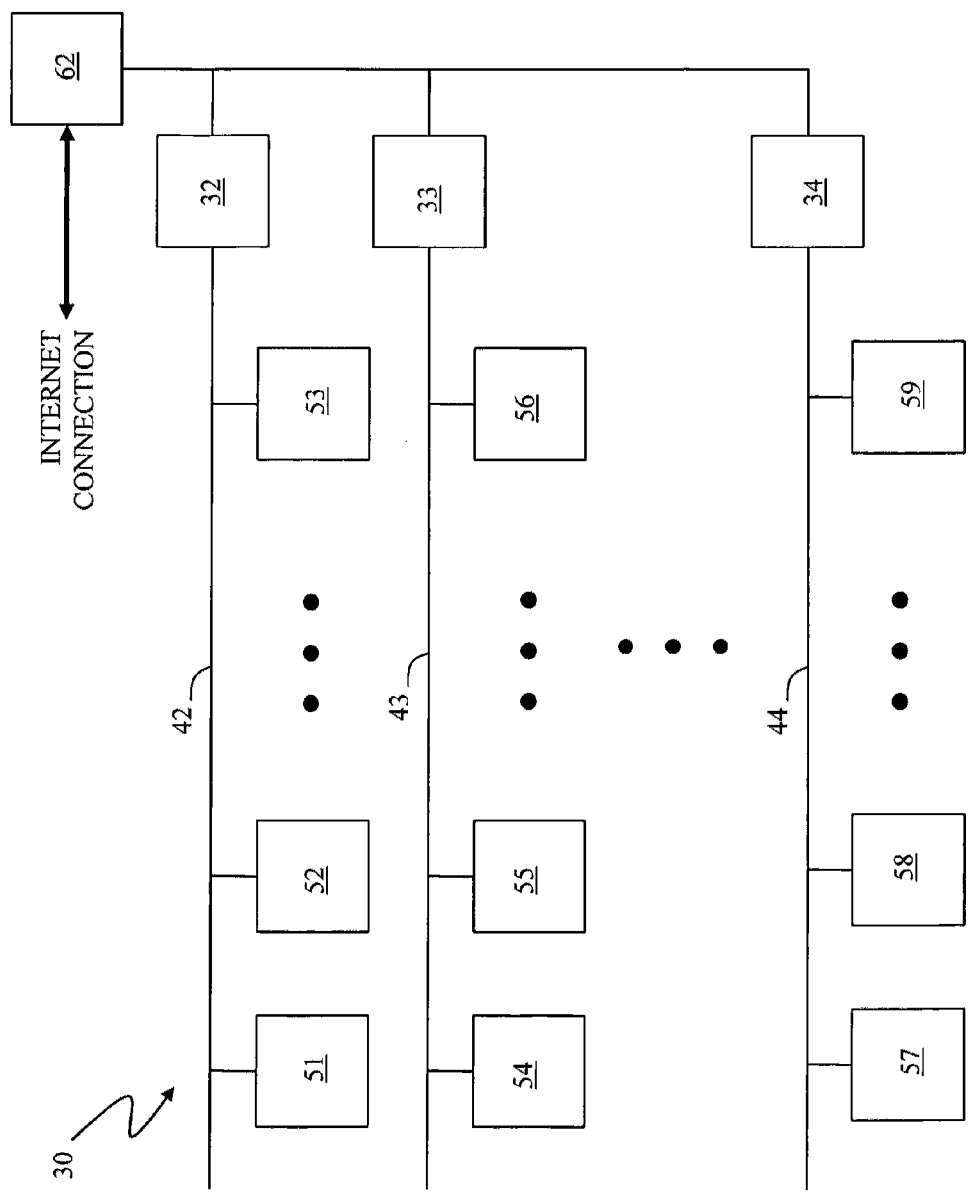
FIG. 1 is a schematic diagram showing a plurality of routers and servers in a server system according to an embodiment of the system described herein.

FIG. 1 is a schematic illustration of a server system 30 that includes a plurality of routers 32-34, each of which may be used to interconnect a plurality of subnets 42-44. Each of the subnets 42-44 may include a subset of a plurality of servers 51-59. The servers 51-59 may communicate using any of a number of appropriate protocols, such as TCP/IP. Each of the servers 51-59 may be provided with a private IP address (e.g., 192.168.X.X) or a public IP address. The routers 32-34 manage data communications to and from the servers 51-59.

The server system 30 may include at least one other additional router 62 that manages data communication between the server system 30 and the Internet (and/or some other network or location), thus providing outside access to the server system 30. Note that it is possible to eliminate the router 62 altogether and have one or more of the other routers 32-34 manage communication to and from the server system 30. In an embodiment herein, the router 62 also provides appropriate security services, such as firewall protection.

Note also that, although each of the subnets 42-44 is shown as having three servers, the number of servers coupled to a subnet may be any number, possibly limited only by the physical address space of the subnet. In addition, there may be any number of subnets and, in some instances, the topology of the server system 30 may be different than that shown. Generally, a server system should be understood as including any system having a plurality of separately addressable servers that may be externally accessible (e.g., through the Internet).

Using virtualization software, one or more of the servers 51-59 may be subdivided into a plurality of virtual machines. A virtual machine (VM) is a software implementation of a machine that executes programs like a physical machine. Virtualization software allows multiple virtual machines with separate operating systems, to run in isolation on the same physical machine. Each virtual machine may have its own set of virtual hardware (e.g., RAM, CPU, NIC, etc.) upon which an operating system and applications are loaded. The operating system sees a consistent, normalized set of hardware regardless of the actual physical hardware components. The term "virtualization software" is used in a broad sense herein to generally refer to any and all software that supports the operation of one or more virtual machines. A number of virtualization software products exist, including the VMware product family provided by EMC Corporation of Hopkinton, Mass. A benefit of providing virtual machines is the ability to host multiple, unrelated, tenants (users) in a single physical server. For example, three unrelated tenants, each hosting their own Web site, may all reside on a single one of the servers 51-59 that is running virtualization software to present what looks like a single stand-alone server to each of the tenants as well as other visitors to the Web sites. The virtualization software maintains separation of each of the tenants, which each separately access their own virtual server(s).

Additional separation may be provided using one or more VLANs, where one or more of the single physical networks is logically divided into discrete logical LANs that can operate independently of each other. A first group of servers belonging to a VLAN that is on a particular physical LAN may operate independently of a second group of servers on the same physical LAN but belonging to a different VLAN. Note also that servers on different physical LANs may belong to the same VLAN. Thus, for example, if the server 51 and the server 55 were on a first VLAN and the server 52 were on a second VLAN, then the servers 51, 55 would operate as if on the same subnet while the server 52 would operate as if on a different subnet even though the servers 51, 52 are on the same physical subnet 42. The VLAN may be implemented using one or more of the routers 32-34, 64 and/or appropriate VLAN software, which may be configured to route data communications according to VLAN topology rather than physical topology. Any conventional VLAN implementation may be used, such as that provided by Cisco Systems.

Figure 2:
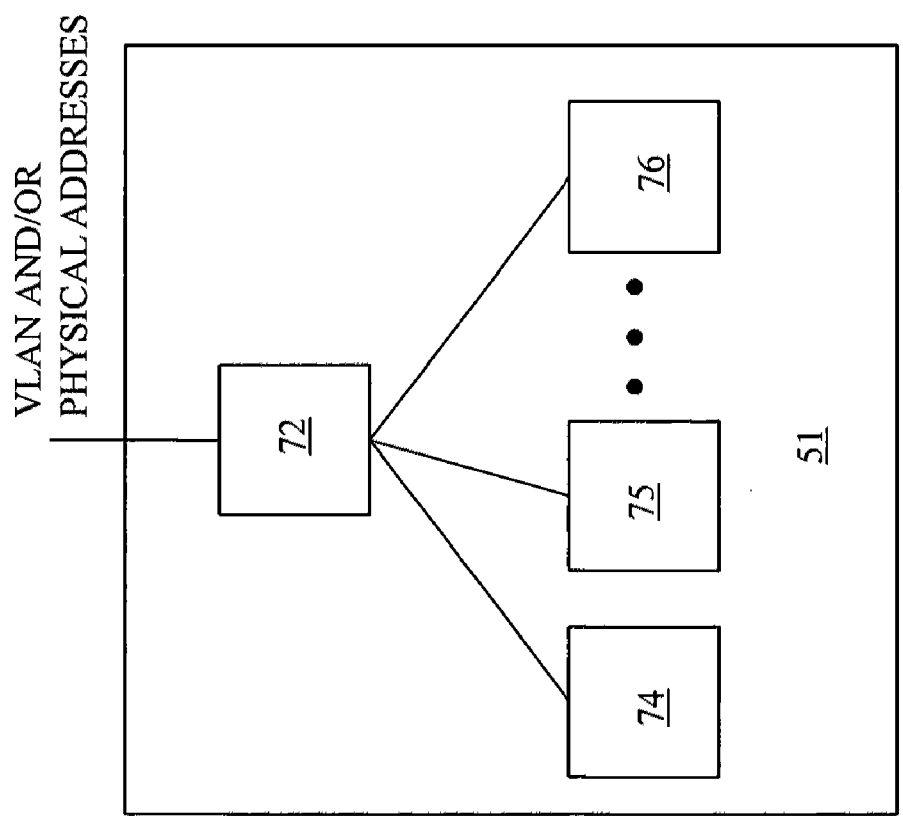
FIG. 2 is a schematic diagram showing a server with a virtual gateway/switch and a plurality of virtual servers according to an embodiment of the system described herein.

FIG. 2 is a schematic illustration showing the server 51 in more detail as including a virtual gateway/switch 72 (implemented, for example, using a virtual server) and a plurality of other virtual machines 74-76. The virtual machines 74-76 represent any number of virtual servers coupled to the virtual gateway/switch 72. Note also that the system described herein may have just one virtual machine coupled to the virtual gateway/switch 72. The virtual gateway/switch 72 is addressable from outside the server 51 using at least one physical address and/or at least one VLAN address (VLAN ID). In an embodiment herein, the virtual gateway/switch 72 may handle internal traffic using a first VLAN address, external traffic using a second VLAN address, and handle management traffic to allocate and deallocate virtual machines using a third VLAN address, but of course other configurations are possible, including, without limitation, using a single address (VLAN or physical) for all traffic and/or using one or more physical addresses of the server 51 for at least some of the traffic to and from the virtual gateway/switch 72.

The virtual gateway/switch 72 may act as a gateway, a firewall, and/or a switch for the virtual machines 74-76. Thus, communication to and from the virtual machines 74-76 is through the virtual gateway/switch 72, in a manner similar to a LAN connecting to the Internet through a gateway/router/firewall where components of the LAN have private addresses for use only within the LAN and communicating entities outside the LAN communicate only with the gateway/router/firewall. Some or all of the other servers 52-59 may be configured in a manner similar to that discussed herein for the server 51. Accordingly, for the discussion herein regarding the server 51, it may be assumed that the same or similar functionality may be provided on some or all of the remaining servers 52-59 of the server system 30.

FIG. 3 is a schematic diagram illustrating servers 102 coupled to a plurality of clients 104-106 in a configuration that may be used in connection with operation of an embodiment the system described herein. Each of the clients 104-106 represents one or more processing devices that receives services from the servers 102. Each of the clients 104-106 may or may not be independent of other ones of the clients 104-106. One or more of the clients 104-106 may be a multiprocessing/multiuser system and possibly have multiple independent users. The clients 104-106 are meant to represent any number of clients.

The services provided by the servers 102 may include compute services as well as data storage and retrieval and related operations, such as data mirroring, cloning, etc. The servers 102 may be implemented using a plurality of services (and/or interconnected servers including SAN components) that are provided by interconnected processing and/or storage devices. In an embodiment herein, each of the clients 104-106 may be coupled to the servers 102 using the Internet, possibly in conjunction with local TCP/IP connections. However, it is possible for one or more of the clients 104-106 to be coupled to the servers 102 using any other appropriate communication mechanism and/or combinations thereof to provide the functionality described herein. For discussions of systems and techniques for online storage services to provide on-demand data storage functions, see U.S. Patent App. Pub. Nos: US 2009-0112879-A1, entitled "Simultaneously Accessing File Objects Through Web Services and File Services"; US 2009-0112811-A1, entitled "Exposing Storage Resources with Differing Capabilities"; US 2009-0112921-A1, entitled "Managing Files Using Layout Storage Objects"; US 2009-0112880-A1, entitled "Managing File Objections in a Data Storage System"; and US 2009-0112789-A1, entitled "Policy Based File Management," all to Oliveira, et al. and which are all hereby incorporated by reference. According to the system described herein, online compute services may be provided using a cloud configuration like that shown in FIG. 3 to provide on-demand compute capacity along with online storage and network infrastructure. As further discussed elsewhere herein, online compute services may be used to execute applications in a virtual environment and resources may be allocated to efficiently manage use of the compute resources according to the system described herein.

Figure 4B:
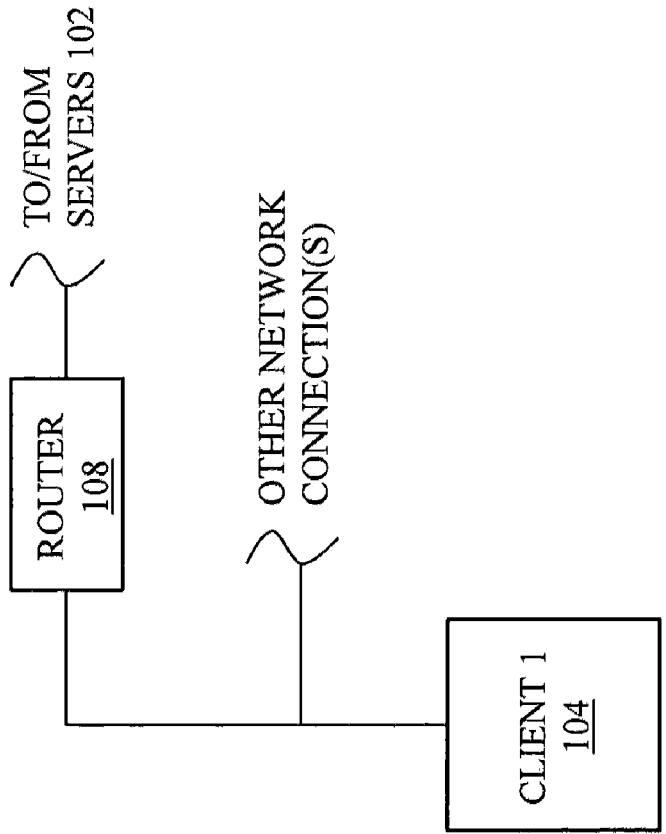
FIGS. 4A and 4B are schematic diagrams illustrating a client coupled to servers and to other network(s) according to an embodiment of the system described herein.
Figure 4A:
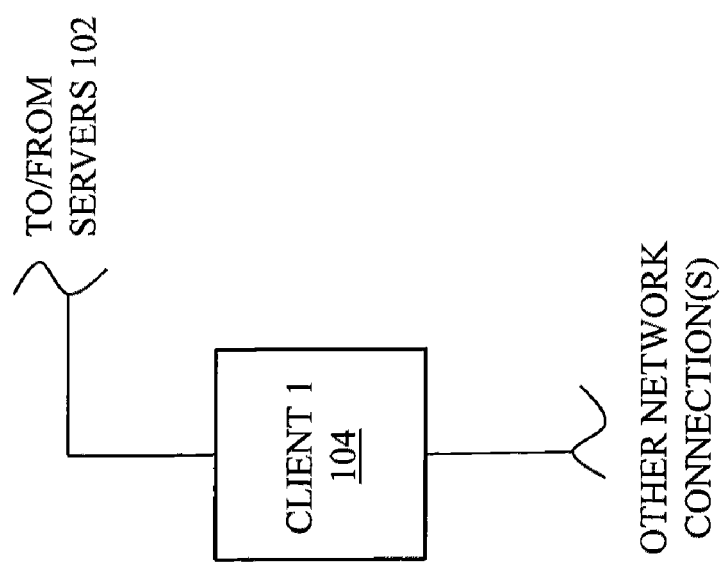

FIG. 4A is a schematic illustration showing the client 104 as being coupled to the servers 102 and to one or more other network(s). The other network(s) may include a LAN. Thus, the client 104 may be a gateway between the servers 102 and a LAN to which one or more other devices (not shown) may also be coupled. The client 104 may act as a local file server to the one or more other devices coupled to the LAN by providing data from the servers 102 to the one or more other devices. Of course, it is possible for one or more other clients to simultaneous act as gateways to the same or different other network(s). Generally, for the discussion herein, reference to a particular one of the clients 104-106 may be understood to include reference to any or all of the clients 104-106 coupled to the servers 102 unless otherwise indicated.

FIG. 4B is a schematic illustration showing the client 104 being coupled to the servers 102 and one or more other network(s) (e.g., a LAN) in a configuration that is different from that shown in FIG. 4A. In the configuration of FIG. 4B, a router 108 is coupled between the servers 102 and the client 104. The router 108 may be any conventional router that may be accessed by the client 104. In the configuration of FIG. 2B, the client 104 uses only a single connection point to both the servers 102 and to the other network(s). In the configuration of FIG. 4B, the client 104 may act as local file server and gateway between the servers 102 and one or more other devices (not shown) coupled to the other network(s). Of course, any other appropriate connection configurations may be used by any of the client 104-106 coupled to the servers 102 and/or to other network(s).

Figure 5:
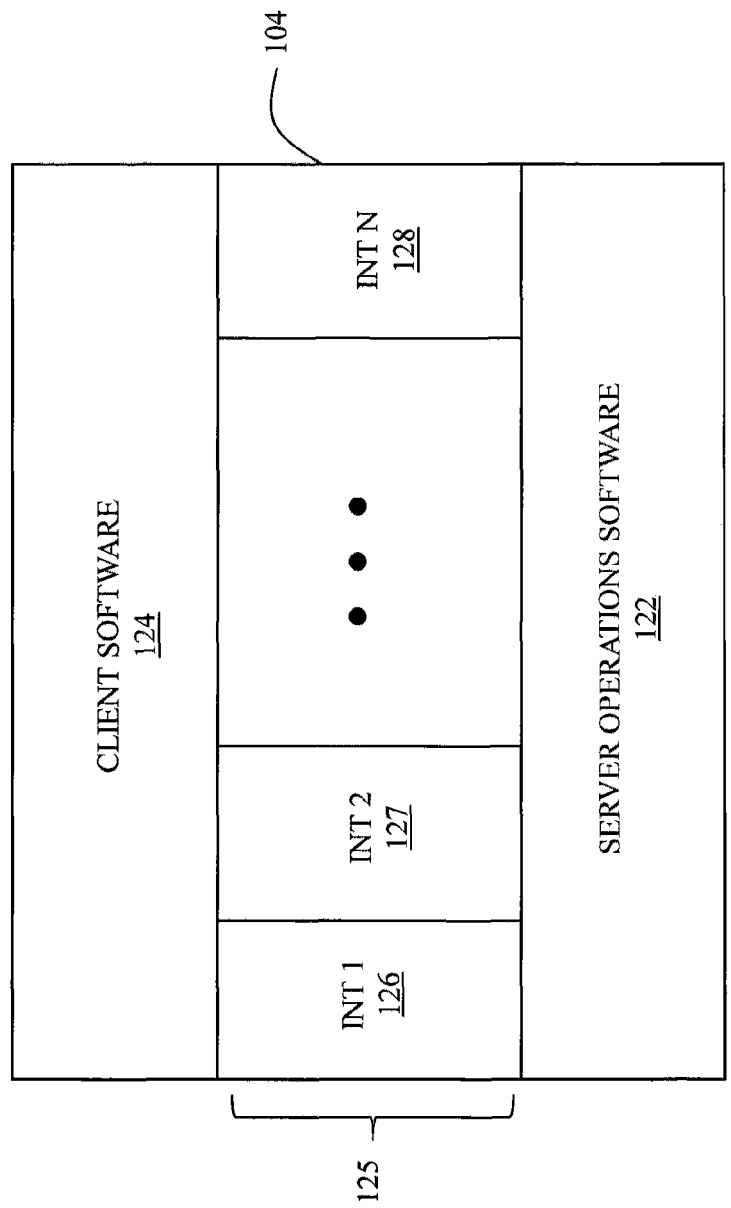
FIG. 5 is a schematic diagram illustrating a client having server operations software, client software, and a plurality of interfaces therebetween according to an embodiment of the system described herein.

FIG. 5 is a schematic illustration showing the client 104 in more detail as having server operations software 122, client software 124, and an interface layer 125 that includes a plurality of interfaces 126-128 between the server operations software 122 and the client software 124. The server operations software 122 facilitates the exchange of information/ data between the client 104 and the servers 102 to provide the functionality described herein. The client software 124 represents any software that may be run on the client 104, including application software, operating system software, Web server software, etc., that is not part of the server operations software 122 or the interface layer 125. As described in more detail elsewhere herein, it is possible to have the client software 124 interact with the servers 102 through different ones of the interfaces 126-128 at the same time. Virtualization software, as discussed elsewhere herein, may be provided as part of the interface layer 125 and/or the server operations software 122. The client 104, and software thereof, may operate in connection with accessing web services for on-demand processing, such as computing and storage functions, in cloud computing environments, as further discussed elsewhere herein.

Figure 6:
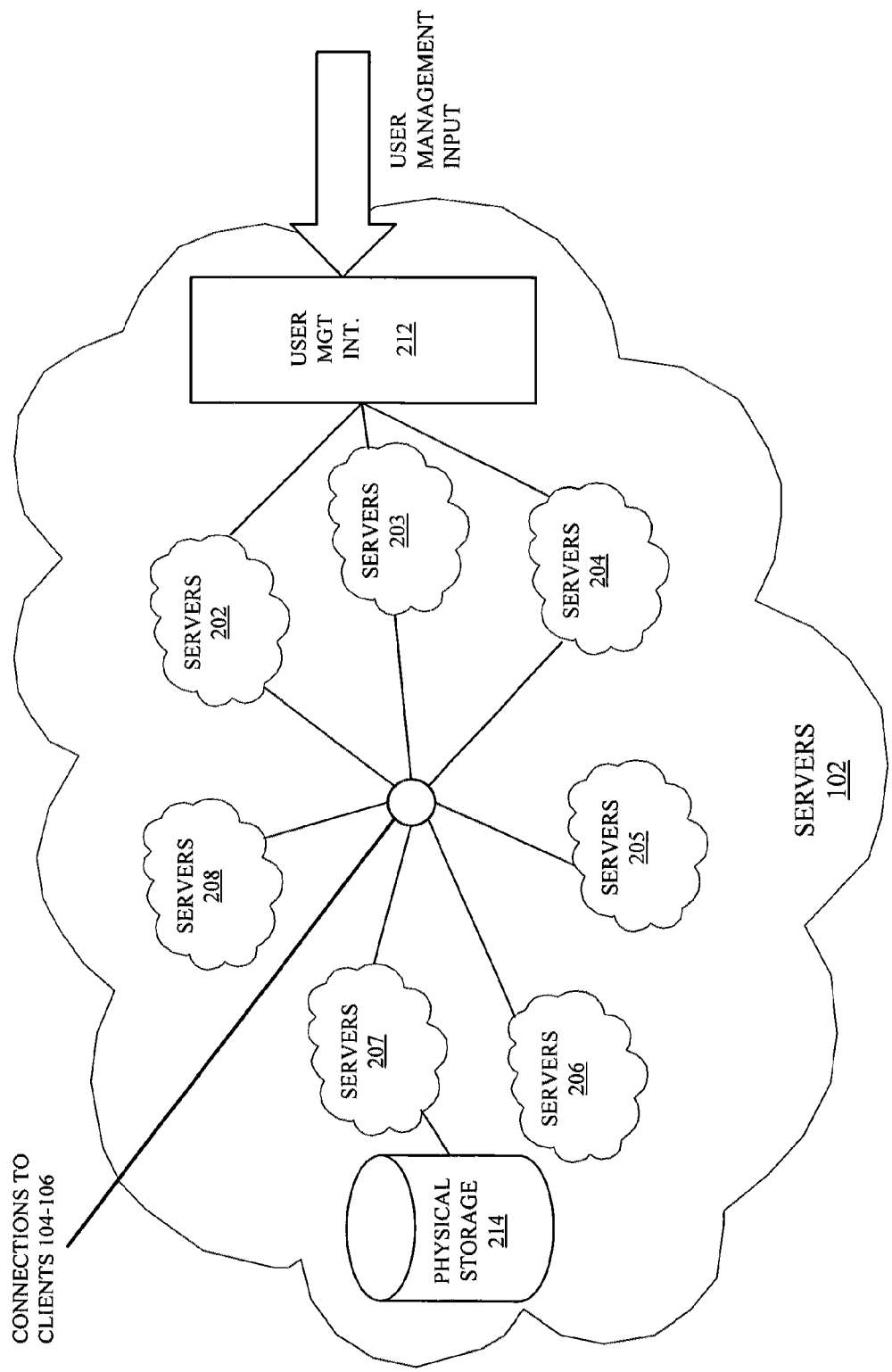
FIG. 6 is a schematic diagram illustrating different types of servers and a user management interface according to an embodiment of the system described herein.

FIG. 6 is a schematic illustration showing the servers 102 in more detail, specifically including servers 202-208. Each of the servers 202-208 may be implemented as one or more unitary processing devices capable of providing the functionality described herein. For the discussion herein, reference to servers should be understood as a reference to one or more servers. The servers 202-208 may be interconnected using any appropriate data communication mechanism, such as TCP/IP, and may be coupled to the clients 104-106 using any appropriate data communication mechanism, such as TCP/IP.

The servers 102 may also include a user management interface 212 that facilitates system management. The management interface 212 exchanges data with one or more of the servers 202-208 to affect how the servers 102 interact with the clients 104-106 and corresponding users. The data may be provided through the user management interface 212 in any one of a number of ways, including conventional interactive computer screen input and data file input (e.g., a text file having user management commands). The data may include information that correlates classes of users and storage parameters such as Quality of Service (QOS), RAID protection level, number and geographic location(s) of mirrors, etc. For example, an administrator may specify through the user management interface 212 that users of a particular class (users belonging to a particular group) store data file objects on storage devices having a particular RAID level protection. The servers 102 may also include physical storage 214 coupled to one or more of the serves 202-208, for example the server 207 as data storage servers. Although the physical storage 214 is shown as a single item, there may be any number of separate physical storage units that may be geographically dispersed. In addition, there may be different types of physical storage units having different capabilities. Accordingly, the physical storage 214 may generically represent one or more instances of physical data storage for the system that is managed by the data storage servers 207.

Additionally, one or more of the servers 202-208 may be used in connection with performing online compute services in virtualized environments according to the system described herein. A compute service according to the system described herein provides on-demand compute capacity, and/or along with storage infrastructure, which may be used to execute applications in a cloud computing environment. Online compute services may be referred to herein as computing as a service or "CaaS". Any of the servers 202-208, the user interface module 212 and/or software provided on one or more of the clients 104-106 may be used in connection with performing one or more of the functions that are discussed herein.

CaaS and/or other online functionality may be provided by web services that enable the launching and managing of servers in virtual data centers using APIs and/or available tools and utilities. For example, the Atmos Online Services provided by EMC Corporation of Hopkinton, Mass. provide a set of Internet-accessible services that provide self-service compute and storage capacity in the cloud. The EMC Atmos Online Storage service delivers secure storage based on EMC Atmos. The EMC Atmos Online Compute service delivers servers on-demand based on VMware virtualization.

In a virtualization environment, a virtual center may provide a central point of control for managing, monitoring, provisioning and migrating virtual machines. The virtual center provides for managing virtual machines to be deployed at one or more virtual data centers and may perform virtual machine lifecycle management tasks, administer users and roles, and view usage metrics, among other functionality. Virtual centers and virtual data centers may operate to control virtual machines in customer data centers and in connection with cloud computing including both internal and external cloud infrastructures and hybrids thereof. Configuring and deploying virtual machines is known in the field of computer science. For example, U.S. Pat. No. 7,577,722 to Khandekar, et al., entitled "Provisioning of Computer Systems Using Virtual Machines," which is hereby incorporated by reference, discloses techniques for configuring and deploying a virtual machine according to user specifications.

Operations of virtual machine may use virtual machines images. A virtual machine image is a file containing a program that may be loaded and executed by a virtual machine and may include additional information used in connection with executing the program. A virtual machine image may be obtained for an operating virtual machine and transferred to another location where another virtual machine may use the virtual machine image to continue execution of the program from the state defined by the virtual machine image. In this way, the virtual machine image may be a snapshot of an execution state of a program by a virtual machine that may be moved between different locations and processing thereafter continued without interruption.

A user may subscribe to a service (such as EMC Atmos Online Compute Service) that provides CaaS functionality and may contract with the service provider for a service level agreement (SLA) that may define service performance metrics and corresponding service level objectives. Fulfilling CaaS function requirements requires access to compute resources. In virtualized environments, compute resources include central processing units (CPU), memory, storage and networking. The system described herein provides for optimizing compute resource allocation based on a configurable over-provisioning factor and usage of existing resources, as further discussed elsewhere herein.

Virtual machines may be grouped into clusters that share similar configurations. Usage of resources of the different clusters may be tracked. Usage metrics may be measured by the compute service according to the system described herein. The compute service may meter usage of CPU (e.g., in GHz-hours), memory (e.g., in GB-hours) and/or virtual machine image storage (e.g., in GB-days), among others. Data for current usage and/or historical usage may be accessed using a management console, for example, using the user management interface 212. The management console may provide a graphical tool for managing a virtual compute environment allow: browsing the compute service environment to view details of an a virtual center, a virtual data center, the state of deployed virtual machines, networks, and tasks; manage the lifecycle of virtual machines from upload to deployment, and power on/off, suspend and clone; assign the compute service admin role to users so that the users can access the compute service; view system metrics for resource usage including storage, CPU, and memory; and enable access to other online services, such as a storage service. Other compute service tools that may be provided in connection with operation of the system described herein may include a command line interface that lets a user prepare virtual management image files for upload to a virtual data center Further, an application programming interface (API), such as a representational state transfer (REST)-based API may be provided that lets a user perform management and administration actions on the virtual data center and the virtual machines. Other software tools may be used in connection with the system described herein.

The system described herein provides techniques for the efficient use of compute resources. As further noted elsewhere herein, virtual machines may be grouped into clusters that share similar configurations. For example, virtual machines may be clustered according to particular processing requirements in connection with compute servers. According to the system described herein, more virtual machines may be assigned to a cluster than the cluster would normally be expected to service at the same time based on the use of an over-provisioning factor that is configured according to user SLAs.

An SLA may include various customer requirements and service provider objectives in connection with providing services, such as cloud computing services, as discussed elsewhere herein. For example, the SLA may indicate how many virtual machines a customer estimates would be required over certain time periods, for example, on a hourly, daily, weekly basis, etc. In other embodiments, the SLA may indicate processing performance requirements (for example processing requirements measured in GHz-hours), network performance requirements and/or storage requirements, among any other suitable requirements set forth in the SLA. The SLA may be stored in a computer-readable format in which requirements of the SLA may be harvested for use in connection with the system described herein. The SLAs may be stored on and/or accessible by the servers 102 and/or the clients 104-106.

The properties of virtual machines allow users' provisioned virtual machines to be migrated between different servers as needed and, accordingly, may be clustered according to particular configurations and requirements as further discussed elsewhere herein. Accordingly, the system described herein provides techniques for controlling the provisioning of users' virtual machines among clusters based on determined requirements obtained from the users' SLAs. Instead of provisioning user's virtual machines only on a fixed basis per cluster, for example according to a pre-specified usage level (e.g., low-usage requirements, medium-usage requirements or high-usage level requirements), the provisioning of virtual machines according to the system described herein may be dynamically controlled and allow for over-provisioning of users' virtual machines to a cluster beyond that which would normally be supported at the cluster absent the provisioning control techniques provided by the system described herein. As further discussed herein, the over-provisioning may be controllable according to specific requirements identified in each user's SLA. Specifically, the system described herein may provide that although the total number of virtual machines allocated to each of the plurality of users exceeds the total number of virtual machines available at the same time, processes corresponding to each of the virtual machines are processed satisfactorily according to each user's SLA. It may be noted that although the system described herein is described principally in connection with the use of virtual machines, and processes corresponding thereto, it may be understood that other types of processing resources may also be used in connection with the system and techniques described herein.

Figure 7:
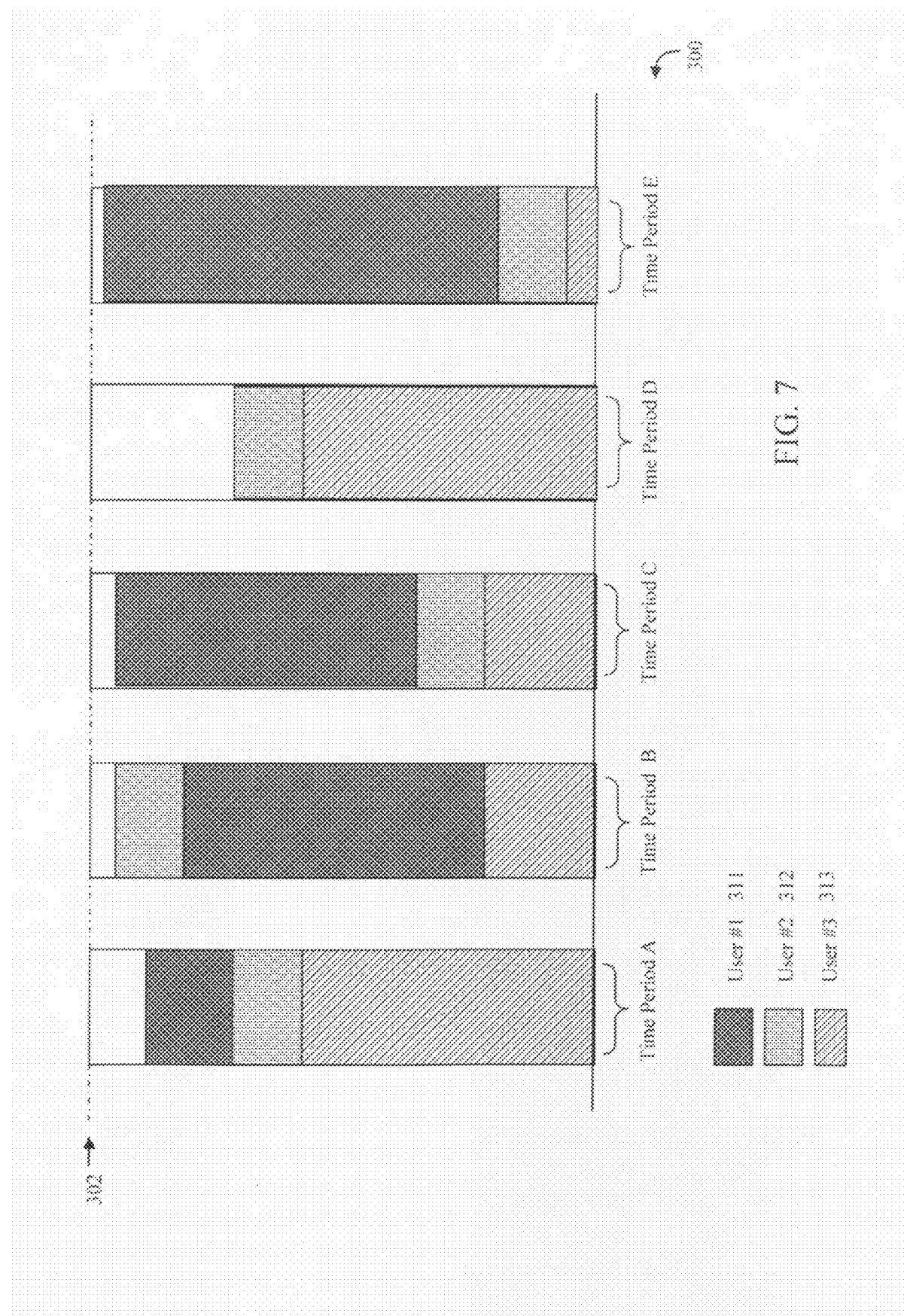
FIG. 7 is a schematic illustration showing provisioning of virtual machines according to an allocation of resources in connection with a cluster supporting multiple users over specified time periods according to an embodiment of the system described herein.

FIG. 7 is a schematic illustration 300 showing provisioning of virtual machines according to an allocation of resources in connection with a cluster supporting multiple users over specified time periods (Time Periods A-E) according to an embodiment of the system described herein. Provisioning of virtual machines for three different users is illustrated across the specified time periods. The cluster may have a maximum capacity 302 (for example, processing capacity and/or other capacity) for each of the specified time periods A-E. The system described herein uses information from the SLAs of each of User #1 311, User #2 312 and #3 313 in connection with assigning virtual machines of the Users #1, #2 and #3 311-313 to the current cluster. In an embodiment, the Users #1, #2 and #3 311-313 may have been assigned to the current cluster according to the information obtained from the SLAs of the users in order to provide an efficient allocation of the resources for the cluster. For example, as illustrated, User #1 311 may have a consistent allocation of virtual machines across all of the time periods whereas User #2 312 and User #3 313 have varied requirements, including peak requirement periods, and in the case of User #2 312, no required allocation for Time Period D, all based on the SLAs of the Users #1, #2 and #3 311-313. In an embodiment, the allocation of resources may be for compute resources in a cloud computing environment.

As illustrated, by allocating the resources of the cluster dynamically according to the user's SLA requirements, e.g., based on the illustrated Time Periods, the total number of allocated resources to service process of the virtual machines may exceed the total number of the resources that are available at the same time. The over-provisioning of virtual machines in the manner set forth by the system described herein enables a more efficient allocation of resources to satisfactorily meet the requirements of each user's SLA. It should also be noted that although the allocation of resources of a cluster is illustrated in connection with performance based on time periods, other embodiments according to the system described herein for assigning virtual machines to one or more clusters may use performance requirements other than that based on time periods. The resources allocated in the cluster may correspond to any desirable resource for a particular application, including, for example, compute resources used in connection with cloud computing as further discussed elsewhere herein.

Figure 8:
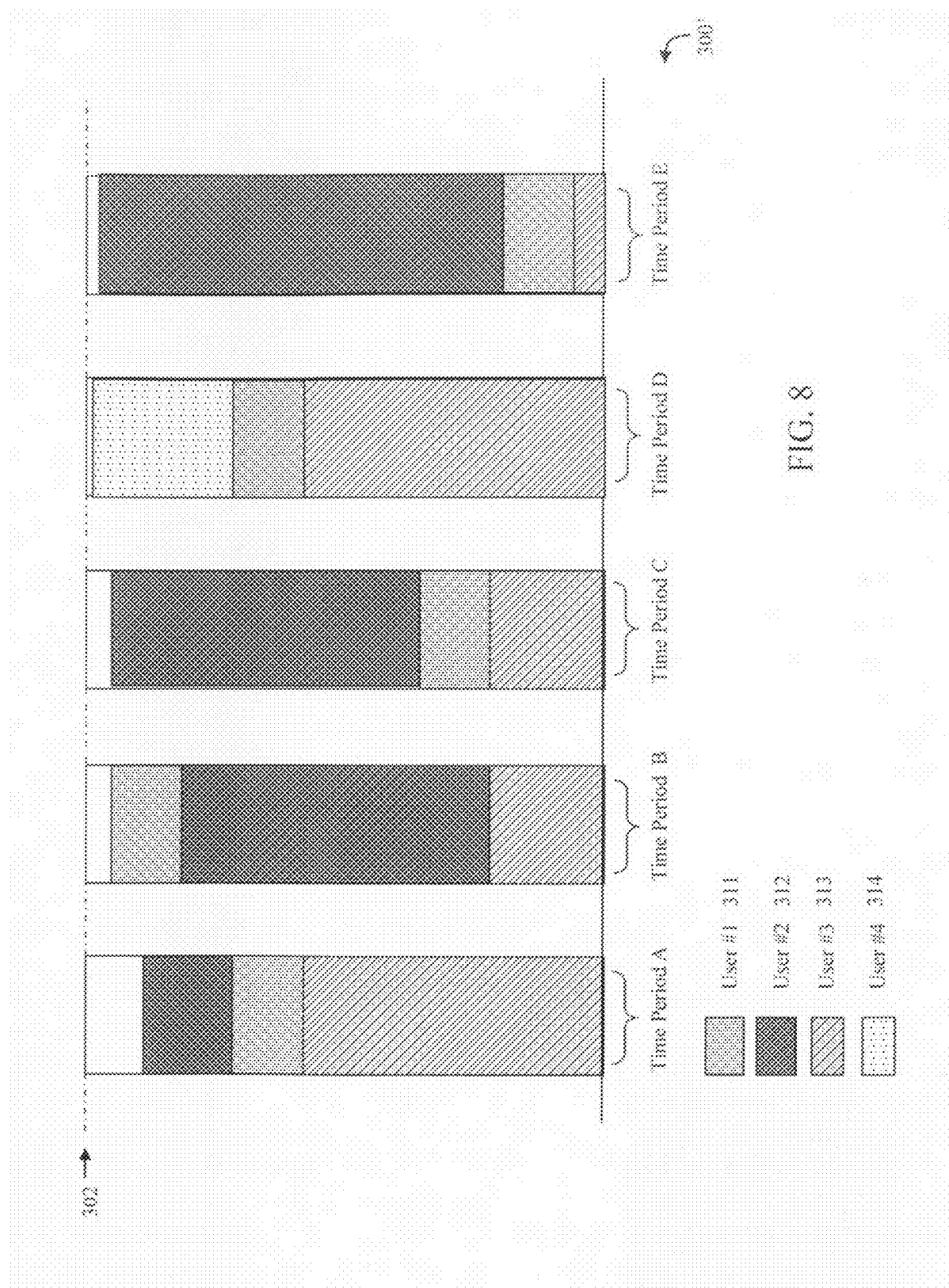
FIG. 8 is a schematic illustration showing the provisioning of virtual machines for an additional user according to an allocation of resources in connection with a cluster supporting multiple users over specified time periods according to an embodiment of the system described herein.

FIG. 8 is a schematic illustration 300' showing the provisioning of virtual machines for an additional user according to an allocation of resources in connection with a cluster supporting multiple users over specified time periods according to an embodiment of the system described herein. The illustration 300' may indicate provisioning like that of the illustration 300 but in which the system described herein may determine from the SLA of another user (User #4 314) that the required performance characteristics enable the virtual machines of the User #4 314 to be assigned to the cluster at the Time Period D. The determination may be made according to the User #4's SLA and recognizing that the resource allocation for the cluster based on the SLAs of the Users #1, #2 and #3 311-313 indicates available resources to service the cluster for the Time Period D. The system described herein may then provide for the assigning of the virtual machines of User #4 314 to the cluster at Time Period D. In an embodiment, the allocation of users' virtual machines may not be made across multiple clusters. Thus, for example, the User #4 314 may require only the indicated allocation at Time Period D in connection with the User #4's SLA requirements. Alternatively, however, in other various embodiments, allocation of users' virtual machines may be performed across multiple clusters and, for example, User #4 314 may have other virtual machines, as required for other Time Periods, assigned to one or more other clusters.

Figure 9:
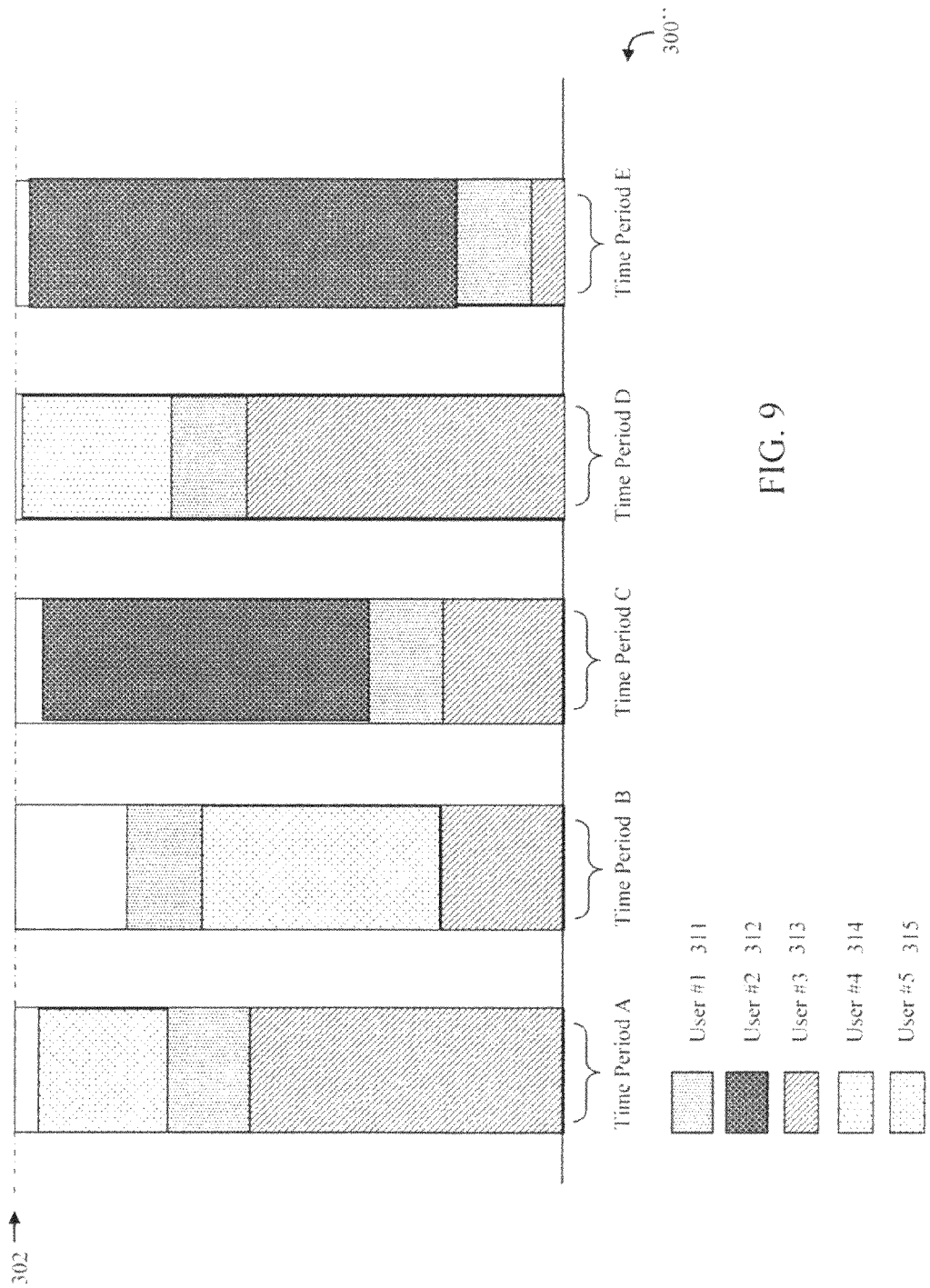
FIG. 9 is a schematic illustration showing the modifications made to the provisioning of virtual machines for multiple users in the cluster according to an embodiment of the system described herein.

FIG. 9 is a schematic illustration 300" showing the modifications made to the provisioning of virtual machines for multiple users in the cluster according to an embodiment of the system described herein. The illustration 300" may indicate modifications to the provisioning of the illustration 300' for the indentified cluster. Specifically, as illustrated, the SLA requirements of User #2 312 may be modified such that no virtual machines are required by User #2 312 for Time Periods A and B. Accordingly, the system described herein may dynamically modify the allocation of resources of the indicated cluster to remove the allocation for User #2 312 from Time Periods A and B. As a result, the system described herein may then determine that the SLA of another user (User #5 315) is such that virtual machines of User #5 315 may be assigned to the cluster according to resources allocated for Time Periods A and B.

In connection with the system described herein, users' SLA requirements may be enforced by the system described herein in order to correctly allocate resources to a cluster. For example, after the removal of the allocation for User #2 312 from Time Period A and B as illustrated in FIG. 9, User #2 312 may not thereafter be able to access resources at Time Period A and B since another allocation of resources would have been made for the new User #5 315. Alternatively, the system described herein may also provide for tracking of actual usage of allocated resources and enable use of resources by a user that were not previously allocated according to actual tracked usage metrics. As further discussed elsewhere herein tracked metrics may include CPU usage (e.g., in GHz-hours), memory (e.g., in GB-hours) and/or storage capacity (e.g., in GB-days), among others. In an embodiment, the system described herein may provide a priority schema in which a user with allocated resources on a cluster has priority over other users such that in the event that other non-allocated users may have their processing operations suspended if the user requires usage for a time period that was previously allocated to that user according to the users' SLA. Other embodiments may be provided for allocated resources according to actual usage and/or processing needs in connection with the system described herein, including, for example, the exchange of allocated resources among users.

Figure 10:
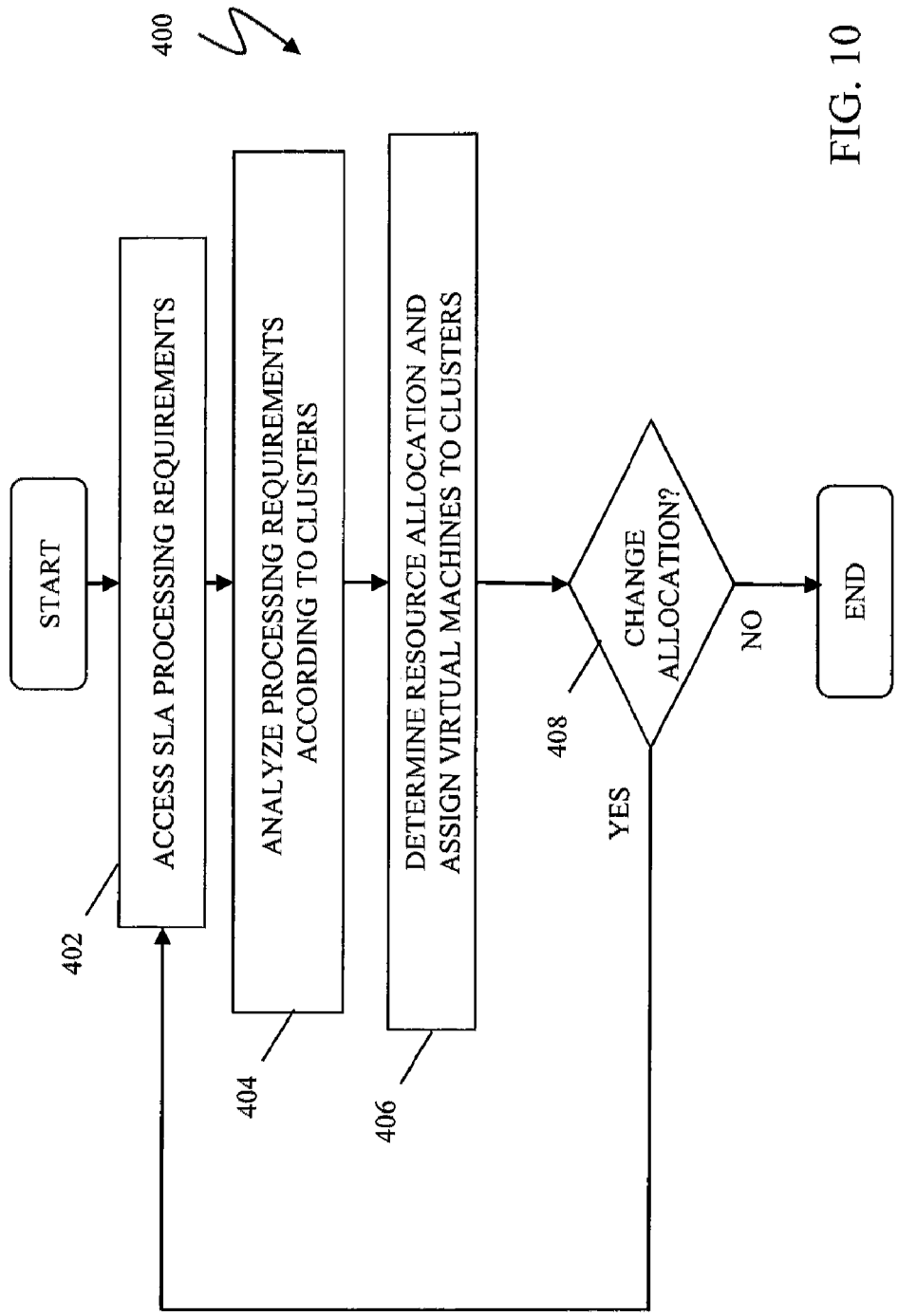
FIG. 10 is a flow diagram showing a method of allocating resources in a cluster according to an embodiment of the system described herein.

FIG. 10 is a flow diagram 400 showing a method of allocating resources in a cluster according to an embodiment of the system described herein. At a step 402, a processor or other software-tool component may access stored user processing requirements, such as compute processing requirements for a cloud computing environment, that have harvested, compiled and/or obtained from users' SLAs. After the step 402, processing proceeds to a step 404 where the users' virtual machine needs are analyzed according to the obtained SLA processing requirements and one or more clusters are determined based thereon. After the step 404, processing proceeds to a step 406 where virtual machines or one of more of the users are provisioned and assigned to one or more of the clusters in connection with an allocation of resources that supports the users' virtual machines needs based on the processing requirements obtained from the users'. SLAs. In accordance with the system described herein, users' virtual machines may be provisioned dynamically and/or over-provisioned based on the obtained SLA requirements to a level that exceeds that which a cluster would normally be expected to support, as further discussed elsewhere herein.

After the step 406, processing proceeds to a test step 408 where it is determined whether the allocation of resources for one or more of the clusters needs to a modified to reflect changed processing requirements. For example, the changes to the processing requirements may include a change to one or more of the SLAs of current users' reflecting changes in the virtual machines required for the current users, may include a change to assign virtual machines from a new user and/or may reflect the tracking of usage metrics of the users, as further discussed elsewhere herein. Alternatively, the system may automatically periodically review the allocation of resources to determine if changes are necessary for current user SLA requirements. If at the test step 408, it is determined that resource allocation is to be modified, processing may proceed back to the step 402. If at the test step 408, it is determined that the resource allocation is not to be modified, then processing is complete.

In various embodiments, the system described herein may provide multiple CaaS application servers to accommodate a large number of user access from the management console. Multiple virtual centers may be supported (supports multiple CaaS processes on demand (PODs)). In a single virtual center, multiple clusters may be supported. In a single cluster, multiple data stores may be supported. A resource pool may be allocated to accommodate a virtual data center for a customer. A single virtual data center may use multiple data stores in the corresponding cluster. As further discussed elsewhere herein, in various embodiments, a customer may be restrained within one virtual center and one virtual center cluster although other embodiments may include the use of multiple virtual centers and clusters; different customers may share one virtual center cluster; and one customer may have multiple data stores.

Figure 11:
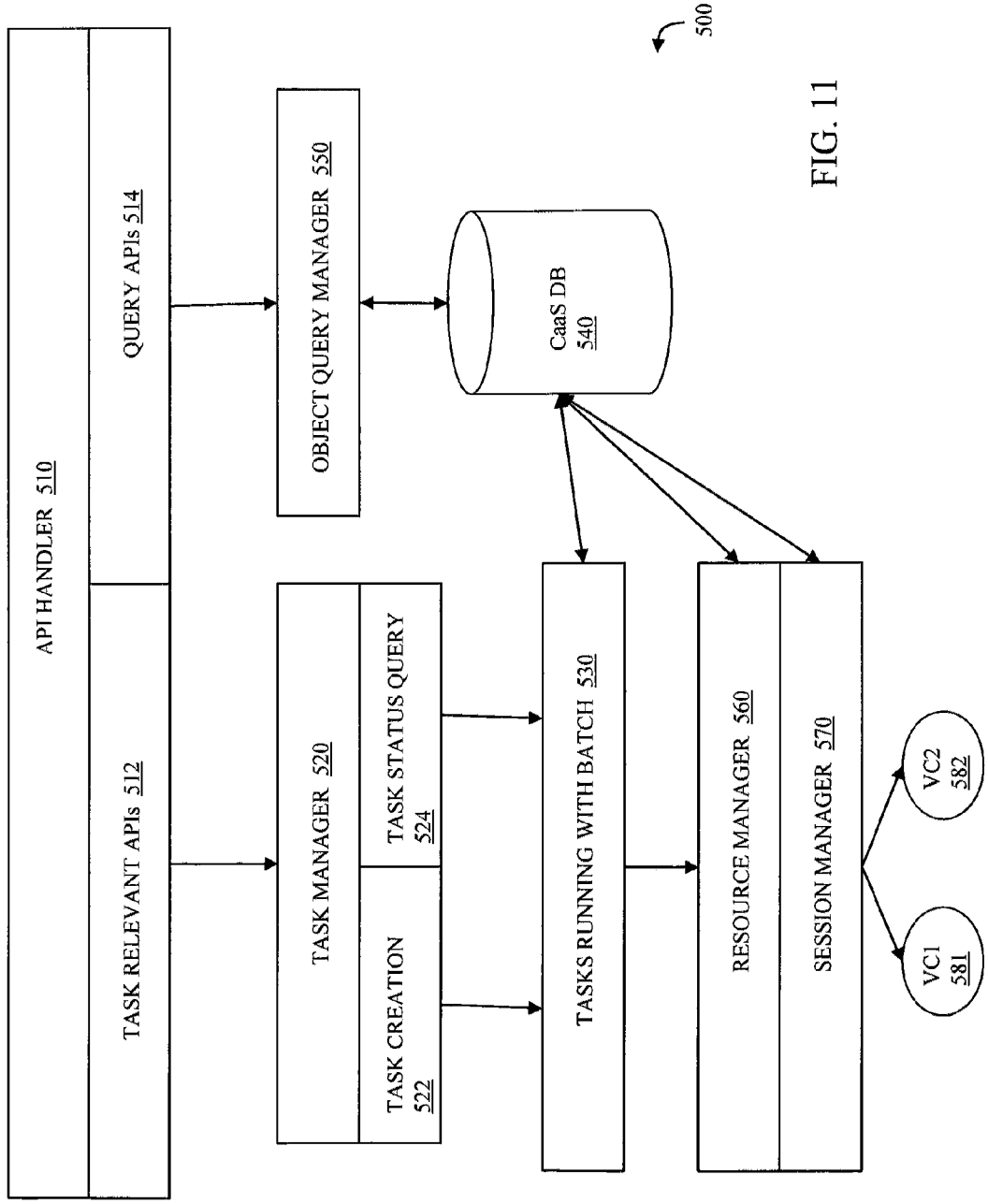
FIG. 11 is a schematic diagram of a high level architecture of application server components that may be used in accordance with an embodiment of the system described herein.

FIG. 11 is a schematic diagram of a high level architecture 500 of application server components that may be used in accordance with an embodiment of the system described herein. An API handler 510 is shown that may control task relevant APIs 512 and query APIs 514. In an embodiment, the API handler may conform with suitable web protocols such as REST. The task relevant APIs 512 may be coupled to a task manager 520 that may either submit a new task to a batch to process or query the status of a submitted task, as further discussed elsewhere herein. In an embodiment the task relevant APIs 512 may use http operations and protocols. The task manager 520, for task relevant APIs, may submit a corresponding invocation for a task stored in the batch. Components of the task manager may include a task creation component 522 that handles requests such as uploading, deployment, cloning, etc. and a Task status query component 524 that may query the completion status for tasks that have been submitted to the batch. A component 530 controls tasks that are running with the batch and may be coupled to a CaaS database (DB) 540 that stores information related to CaaS processes. The CaaS DB may include tables of information corresponding to users, virtual centers; virtual data centers; virtual center clusters; resource pools; VLANs; tasks; batch execution; usage metrics among other information suitable for operation of the system described herein. A resource manager 560 may map objects in the virtual center into the CaaS DB 540. The session manager 570 may maintain the connections based on corresponding VC endpoints (VC1 581 and VC2 582).

The query APIs 514 may retrieve attributes and/or properties related to a virtual machine or a virtual data center, etc, via an object query manager 550. The information retrieved by the query APIs 514 may be stored in the CaaS DB 540. The process of query APIs 514 does not require communicating with a virtual center to obtain corresponding information.

Figure 12:
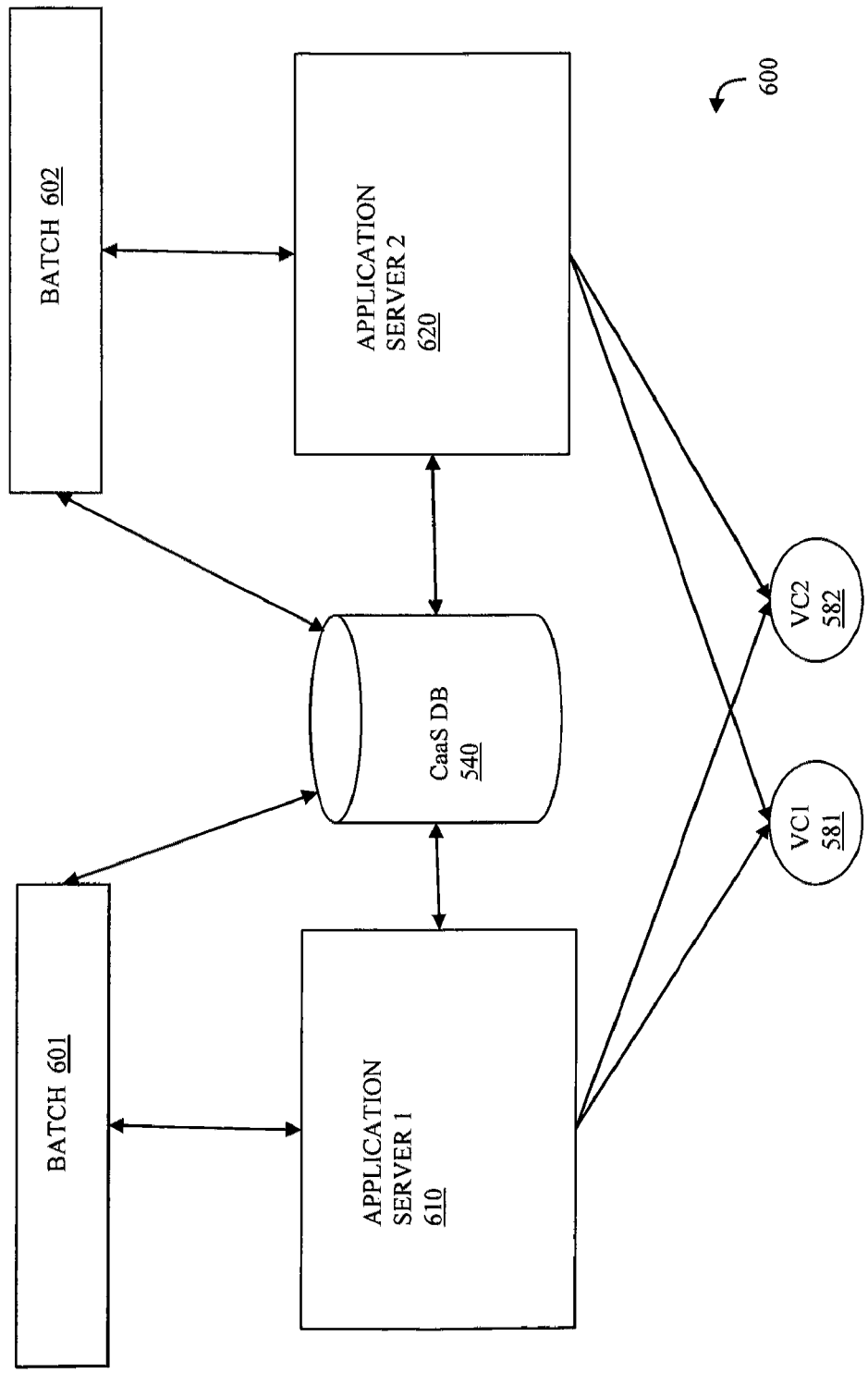
FIG. 12 is a schematic diagram showing operation of multiple application servers in connection with an embodiment of the system described herein.

FIG. 12 is a schematic diagram 600 showing operation of multiple application servers (Application Server 1 610 and Application Server 2 620) in connection with an embodiment of the system described herein. Each of the Application Servers 1 and 2 610, 620 may be obtain tasks and task information from respective batches 601, 602. Each of the Application Serves 1, 2 610, 620 may be coupled to the CaaS DB 540 and to the virtual center points (VC1 and VC2 581, 582), as further discussed elsewhere herein.

Figure 13:
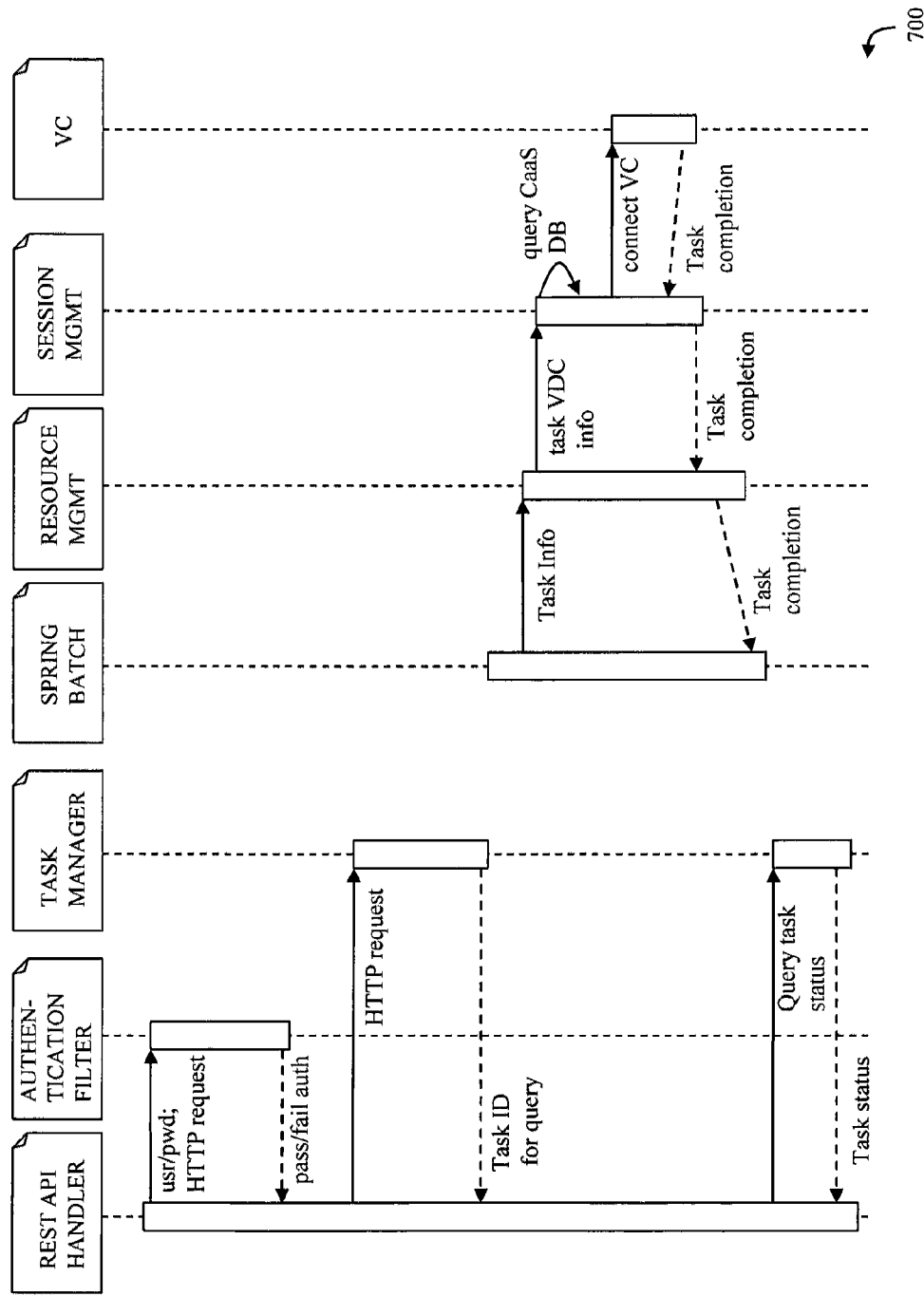
FIG. 13 is a sequence diagram illustrating operation of the task relevant APIs in connection with an embodiment of the system described herein.

FIG. 13 is a sequence diagram 700 illustrating operation of the task relevant APIs of an application server in connection with an embodiment of the system described herein. The diagram 700 shows the exchange of requests and information among components of the application server in connection with operation of the task relevant APIs (e.g., task relevant APIs 512), as further discussed herein, including the following components: the API handler, an authentication filter (used in connection with authenticating subscribing users), the task manager, the batch, the resource manager, the session manager, the virtual center, and the CaaS DB. Tasks may include: Delete virtual machine; Clone to virtual machine; Power on virtual machine; Power off virtual machine; Suspend virtual machine; Resume virtual machine; Reset virtual machine; Put on virtual machine and Modify virtual machine attribute; Put on virtual machine compute resources; Get tasks; Delete virtual data center; Upload virtual machine to virtual data center; Deploy virtual machine to virtual data center; Modify the name of a virtual data center; Put on virtual data center compute resource to Modify the virtual machine compute resource; Get task; Delete user; Create user; Reset password (virtual data center user); Create network; and/or Delete network, among others.

Figure 14:
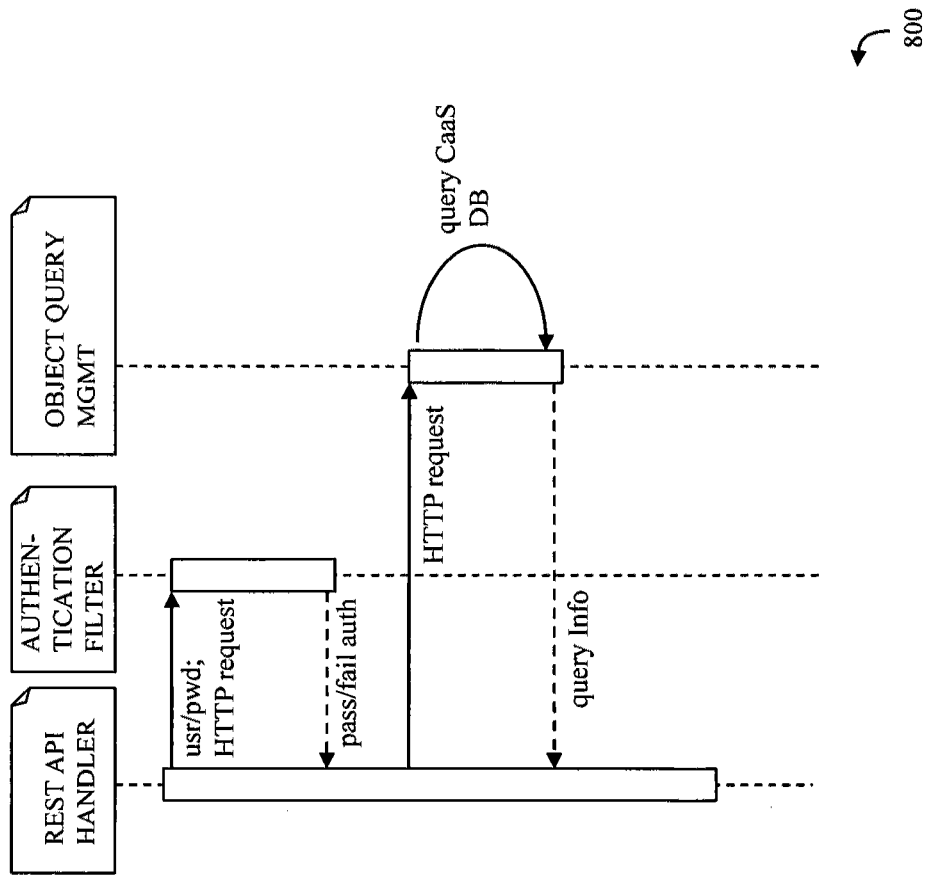
FIG. 14 is a sequence diagram illustrating operation of Query APIs in connection with an embodiment of the system described herein.

FIG. 14 is a sequence diagram 800 illustrating operation of query APIs of the application server in connection with an embodiment of the system described herein. The diagram 800 shows the exchange of requests and information among components of the application server in connection with operation of the query APIs (e.g., query APIs 514), as further discussed elsewhere herein, including the following components: the API handler, the authentication filer, the object query manager, and the CaaS DB. Queries may include: Get virtual machine compute resources; Get virtual machine virtual disks; Get virtual machine virtual network identification cards (NICs); Get virtual data center; Get virtual data center compute resource; Get virtual machines; Get users; Get networks; Get data stores; Get virtual disk; Get virtual NIC; Get data store list; and/or Get data store, among others.

Figure 15:
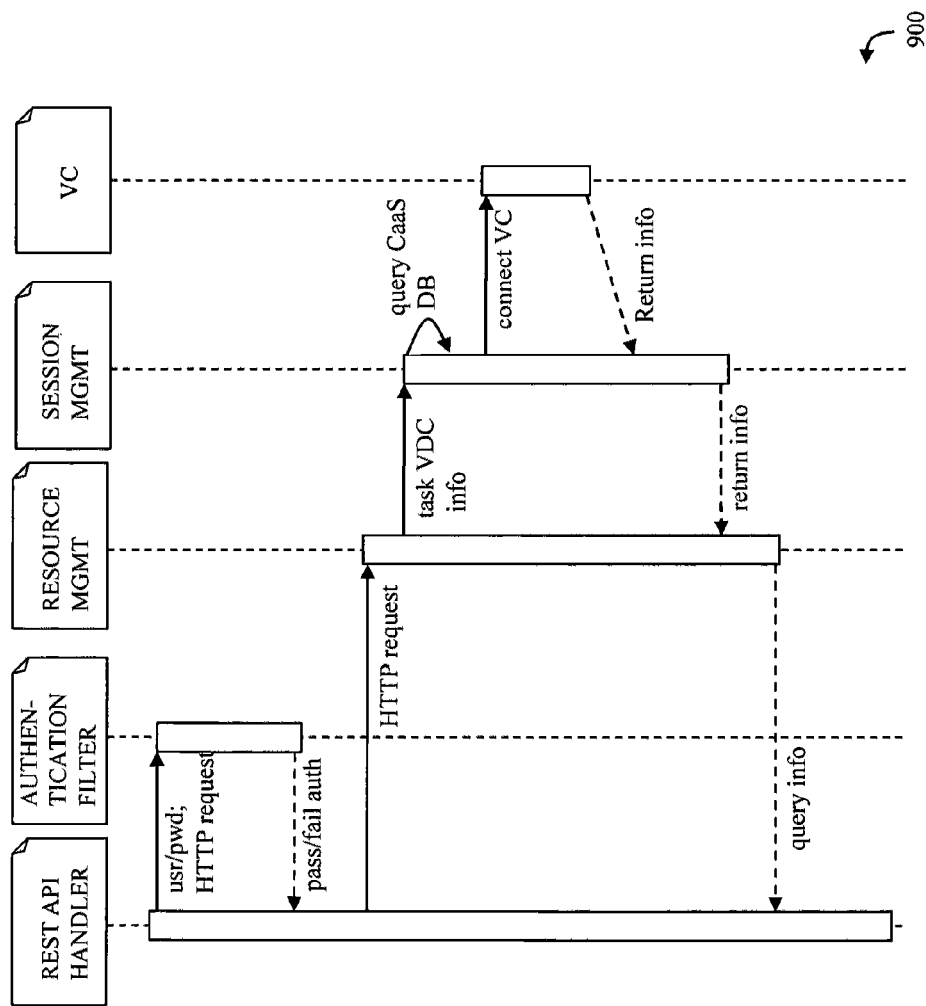
FIG. 15 is a sequence diagram illustrating operation of volatile Query APIs in connection with an embodiment of the system described herein.

FIG. 15 is a sequence diagram 900 illustrating operation of volatile query APIs in connection with an embodiment of the system described herein. Specifically, there are some exceptions for the Query APIs discussed above. Volatile properties such as virtual machine status and/or virtual machine logs may not be stored in the CaaS DB and may require direct connection with the virtual center. The diagram 900 shows the exchange of requests and information among components of the application server in connection with operation of the volatile query APIs, and including the following components: the API handler, the authentication filer, the resource manager, the session manager, the virtual center, and the CaaS DB.

In an embodiment, the attributes and/or properties of a virtual machine and/or virtual data center may be stored in the CaaS DB. This provides a CaaS logic view of the virtual center status rather than expose the virtual center physical view to the end user. For example, during the process or registering a virtual machine in a virtual data center, the virtual data center may show up only after the post configuration is done. Further, the performance of query may be improved and the number of requests to the virtual center may be minimized. Virtual machine or virtual data center information stored in the CaaS DB may be queried more efficiently than the virtual center. For example, given a virtual machine ID or name, the virtual data center to which it belongs may be queried and/or given a virtual data center ID or name, the CaaS POD where it exists may be queried.

According to another embodiment, it is possible that during the processing of a task, the virtual center may malfunction or disconnect with the application server. As a result, the content of the CaaS DB may not be exactly the same as the virtual center status. In order to address this problem, a flag in a table corresponding to the virtual data center may be set to identify the inconsistency in an exception handler. Whenever another virtual data center wants to query the information related to the subject virtual data center, the flag may be checked beforehand. If the flag designates an inconsistency, a sync tool with the scope of this virtual data center may be run to resolve the issue. Once the data is recovered and the inconsistency resolved, the flag may be reset.

Various of the embodiments discussed herein may be combined with each other in appropriate combinations in connection with the system described herein. Additionally, in some instances, the order of steps in the flowcharts may be modified, where appropriate. Further, the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system. Further, any appropriate servers/routers may be used. Some or all of the routers may be replaced with other devices and/or some or all of the services provided by the routers may be provided by some or all of the servers.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of allocating resources in a computer system, comprising:

accessing information identifying service requirements between a service provider and each of a plurality of users;

allocating processing resources to each of the plurality of users according to the information identifying service requirements between each of the plurality of users and the service provider, wherein the total number of processing resources allocated to the users exceeds the total number of processing resources available, wherein the information identifying service requirements is accessed from a service level agreement between each of the plurality of users and the service provider, the service level agreement of each of the plurality of users being stored in a computer-readable format, and wherein the information identifying service requirements is harvested from each user's service level agreement and used in the allocating of the processing resources for a specified period of time;

modifying the allocating of the processing resources in response to a change in the service requirements of the service level agreement for at least one of the users over the specified period of time; and enforcing the service requirements for the plurality of users over the specified period of time according to the allocating of the processing resources after the change in service requirements.

2. The method according to claim 1, wherein the processing resources include at least one virtual machine for each of the users that corresponds to a process serviceable by the service provider, and wherein the at least one virtual machine is assigned to at least one server of the service provider according to the allocation of resources to service the process corresponding to the at least one virtual machine.

3. The method according to claim 2, wherein the process corresponding to the at least one virtual machine requires compute resources to be serviced, the compute resources including at least one of: a central processing unit, a memory, storage capacity, and networking bandwidth.

4. The method according to claim 2, wherein the at least one server is remotely accessible via the Internet to service the process of the at least one virtual machine for each of the users.

5. The method according to claim 2, wherein the virtual machines of the plurality of users are grouped into at least one cluster for servicing by the service provider.

6. The method according to claim 1, wherein the information identifying service requirements is accessed from a service level agreement between each of the plurality of users and the service provider.

7. The method according to claim 1, wherein the service provider provides computing as a service via a cloud computing environment.

8. A non-transitory computer readable storage medium storing computer software that allocates resources in a computer system, the computer software comprising:

executable code that accesses information identifying service requirements between a service provider and each of a plurality of users;

executable code that allocates processing resources to each of the plurality of users according to the accessed information identifying service requirements between each of the plurality of users and the service provider, wherein the total number of processing resources allocated to the users exceeds the total number of processing resources available, wherein the information identifying service requirements is accessed from a service level agreement between each of the plurality of users and the service provider, the service level agreement of each of the plurality of users being stored in a computer-readable format, and wherein the information identifying service requirements is harvested from each user's service level agreement and used in the allocating of the processing resources for a specified period of time;

executable code that modifies the allocating of the processing resources in response to a change in the service requirements of the service level agreement for at least one of the users over the specified period of time; and executable code that enforces the service requirements for the plurality of users over the specified period of time according to the allocating of the processing resources after the change in service requirements.

9. The non-transitory computer readable storage medium according to claim 8, wherein the processing resources include at least one virtual machine for each of the users that corresponds to a process serviceable by the service provider, and wherein the at least one virtual machine is assigned to at least one server of the service provider according to the allocation of resources to service the process corresponding to the at least one virtual machine.

10. The non-transitory computer readable storage medium according to claim 9, wherein the process corresponding to the at least one virtual machine requires compute resources to be serviced, the compute resources including at least one of: a central processing unit, a memory, storage capacity, and networking bandwidth.

11. The non-transitory computer readable storage medium according to claim 9, wherein the at least one server is remotely accessible via the Internet to service the process of the at least one virtual machine for each of the users.

12. The non-transitory computer readable storage medium according to claim 9, wherein the virtual machines of the plurality of users are grouped into at least one cluster for servicing by the service provider.

13. The non-transitory computer readable storage medium according to claim 8, wherein the information identifying service requirements is accessed from a service level agreement between each of the plurality of users and the service provider.

14. The non-transitory computer readable storage medium according to claim 8, wherein the service provider provides computing as a service via a cloud computing environment.

15. A method of requesting resources in a computer system, comprising:

each of a plurality of users providing information identifying service requirements required of a service provider;

each of the plurality of users requesting processing resources according to the information identifying service requirements required of the service provider, wherein the total number of processing resources requested by all of the plurality of users exceeds the total number of processing resources available at the same time, and wherein the service requirements from the information identifying service requirements required of the service provider are satisfied for each of the plurality of users, wherein the information identifying service requirements is provided from a service level agreement between each of the plurality of users and the service provider, the service level agreement of each of the plurality of users being stored in a computer-readable format, and wherein the information identifying service requirements is harvested from each user's service level agreement and used in the allocating of the processing resources for a specified period of time;

at least one of the plurality of users causing a change in the service requirements of the service level agreement of the at least one user over the specified period of time that causes a modification of the allocating of the processing resources; and at least one other user of the plurality of users receiving a modified allocation of processing resources over the specified period of time according to the allocating of the processing resources after the change in service requirements.

16. The method according to claim 15, wherein the processing resources include at least one virtual machine for each of the users that corresponds to a process serviceable by the service provider, and wherein the at least one virtual machine is assigned to at least one server of the service provider according to the allocation of resources to service the process of the at least one virtual machine.

17. The method according to claim 16, wherein the process corresponding to the at least one virtual machine requires compute resources to be serviced, the compute resources including at least one of: a central processing unit, a memory, storage capacity, and networking bandwidth.

18. The method according to claim 16, wherein the virtual machines of the plurality of users are grouped into at least one cluster for servicing by the service provider.

19. A non-transitory computer readable storage medium storing computer software that requests resources in a computer system, the computer software comprising:
    executable code that provides, for each of a plurality of users, information identifying service requirements required of a service provider;
    executable code that requests, for each of the plurality of users, processing resources according to the information identifying service requirements required of the service provider, wherein the total number of processing resources requested by all of the plurality of users exceeds the total number of processing resources available at the same time, and wherein the service requirements from the information identifying service requirements required of the service provider are satisfied for each of the plurality of users, wherein the information identifying service requirements is provided from a service level agreement between each of the plurality of users and the service provider, the service level agreement of each of the plurality of users being stored in a computer-readable format, and wherein the information identifying service requirements is harvested from each user's service level agreement and used in the allocating of the processing resources for a specified period of time;
    executable code that, for at least one of the plurality of users, causes a change in the service requirements of the service level agreement of the at least one user over the specified period of time that causes a modification of the allocating of the processing resources; and
    executable code that, for at least one other user of the plurality of users, receives information corresponding to modified allocation of processing resources over the specified period of time according to the allocating of the processing resources after the change in service requirements.

20. The non-transitory computer readable storage medium according to claim 19, wherein the processing resources include at least one virtual machine for each of the users that corresponds to a process serviceable by the service provider, and wherein the at least one virtual machine is assigned to at least one server of the service provider according to the allocation of resources to service the process of the at least one virtual machine.

21. The non-transitory computer readable storage medium according to claim 20, wherein the process corresponding to the at least one virtual machine requires compute resources to be serviced, the compute resources including at least one of: a central processing unit, a memory, storage capacity, and networking bandwidth.

22. The non-transitory computer readable storage medium according to claim 20, wherein the virtual machines of the plurality of users are grouped into at least one cluster for servicing by the service provider.

* * * * *